(12) United States Patent  
Marukawa et al.

(10) Patent No.: US 10,994,600 B2  
(45) Date of Patent: May 4, 2021

(54) LAYOUT STRUCTURE FOR FRONT COMPARTMENT OF HYBRID VEHICLE

(71) Applicant: TOYOTA JIDOSHA KABUSHIKI KAISHA, Toyota (JP)

(72) Inventors: Naoki Marukawa, Numazu (JP); Shuichi Iwata, Nisshin (JP); Hiroshi Yaguchi, Susono (JP); Naoyuki Kishimoto, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 49 days.

(21) Appl. No.: 16/592,304

(22) Filed: Oct. 3, 2019

(65) Prior Publication Data

US 2020/0156456 A1 May 21, 2020

(30) Foreign Application Priority Data

Nov. 19, 2018 (JP) .............................. JP2018-216667

(51) Int. Cl.

| | |
|---|---|
| *B60K 6/40* | (2007.10) |
| *B60K 6/28* | (2007.10) |
| *B60K 6/24* | (2007.10) |
| *B60K 11/02* | (2006.01) |
| *B60W 20/00* | (2016.01) |
| *B60K 6/36* | (2007.10) |

(52) U.S. Cl.  
CPC .................. *B60K 6/40* (2013.01); *B60K 6/24* (2013.01); *B60K 6/28* (2013.01); *B60K 11/02* (2013.01); *B60W 20/00* (2013.01); *B60K 6/36* (2013.01); *B60Y 2200/92* (2013.01); *B60Y 2306/05* (2013.01); *B60Y 2400/112* (2013.01)

(58) Field of Classification Search  
CPC ... B60K 6/40; B60K 6/28; B60K 6/24; B60K 11/02; B60W 20/00; B60Y 2400/112; B60Y 2200/92; B60Y 2306/05  
See application file for complete search history.

(56) References Cited

U.S. PATENT DOCUMENTS

| 7,325,638 | B1* | 2/2008 | Belloso | ................ B60K 17/354 180/69.6 |
|---|---|---|---|---|
| 2010/0116571 | A1* | 5/2010 | Suzuki | .................. B60K 6/445 180/65.25 |
| 2013/0184916 | A1* | 7/2013 | Goodwin | ............... B60K 6/485 701/22 |
| 2013/0324342 | A1* | 12/2013 | Onozaki | ................. F16H 48/34 475/150 |

(Continued)

FOREIGN PATENT DOCUMENTS

JP 2018-001810 A 1/2018

*Primary Examiner* — Erez Gurari  
(74) *Attorney, Agent, or Firm* — Sughrue Mion, PLLC

(57) ABSTRACT

A front compartment is provided with an engine, an air cleaner, a radiator, a reservoir tank, a motor unit, an auxiliary battery, and an EFI-ECU. The engine, the reservoir tank, the motor unit and the EFI-ECU are aligned in a vehicle's width direction. The air cleaner and the auxiliary battery are also aligned in the vehicle's width direction. The air cleaner is located in front of the motor unit. The motor unit includes a power control unit and a transaxle. The air cleaner is located in front of the power control unit. The auxiliary battery is located diagonally forward to left of the motor unit.

6 Claims, 4 Drawing Sheets

(56) References Cited

U.S. PATENT DOCUMENTS

| | | | |
|---|---|---|---|
| 2014/0374211 A1* | 12/2014 | Date | B60K 6/387 |
| | | | 192/85.01 |
| 2017/0015199 A1* | 1/2017 | Shiba | B60L 3/0007 |
| 2017/0096066 A1* | 4/2017 | Lee | H05K 7/209 |
| 2017/0144637 A1* | 5/2017 | Mashiki | G05G 1/327 |
| 2019/0270373 A1* | 9/2019 | Ogino | B60K 6/405 |
| 2020/0070755 A1* | 3/2020 | Yuki | H05K 5/03 |
| 2020/0130507 A1* | 4/2020 | Hashimoto | F01P 3/18 |

* cited by examiner

LAYOUT STRUCTURE FOR FRONT COMPARTMENT OF HYBRID VEHICLE

CROSS-REFERENCE TO RELATED APPLICATION

The present disclosure claims priority under 35 U.S.C. § 119 to Japanese Patent Application No. 2018-216667, filed on Nov. 19, 2018. The content of the application is incorporated herein by reference in their entirety.

TECHNICAL FIELD

The present disclosure relates to a layout structure of a front compartment of a hybrid vehicle (hereinafter also referred to as a "HV vehicle").

BACKGROUND

JP2018-001810A discloses a layout structure for protecting a wire harness from damages in an event of a HV vehicle collision. The wire harness connects a power control unit (hereinafter also referred to as a "PCU") and a hybrid controller (hereinafter also referred to as a "HV controller"). The PCU includes a capacitor that smooths current in a high-voltage battery. The HV controller transmits a discharge command to the PCU to discharge the capacitor in the event of the HV vehicle collision.

The wire harness and the PCU are connected to each other on an upper surface of the PCU and also on a rear side of the HV vehicle. By connecting the wire harness and the PCU in such a position, it is possible to prevent the wire harness from being damaged in the event of the HV vehicle collision.

However, the layout described above emphasizes reliable transmission of the discharge command, and do not directly prevent damages to the PCU as a high-voltage component. Therefore, an improvement from this viewpoint is desired.

The present disclosure addresses the above described problem, and one object of the present disclosure is to provide a technique that is able to prevent the PCU from being damaged in the event of the HV vehicle collision.

SUMMARY

A first aspect is a layout structure for a front compartment of a HV vehicle.

The front compartment is provided with an engine, a transaxle, a PCU, a low-voltage battery, and a vehicle component.

The transaxle is configured to house a motor for traveling.

The PCU is provided on an upper surface of the transaxle.

The PCU is configured to control transmission of power between the motor for traveling and the high-voltage battery.

A stiffness of the vehicle component is lower than that of the PCU.

The engine and the transaxle are aligned in a vehicle's width direction.

The vehicle component and the low-voltage battery are aligned in a vehicle's width direction in front of the PCU.

The vehicle component is located in front of the PCU.

The low-voltage battery is located in an outer side of the HV vehicle than the vehicle component.

A second aspect further has the following feature in the first aspect.

The vehicle component is an air cleaner of the engine.

A third aspect further has the following feature in the first aspect.

The vehicle component is a reservoir tank of coolant for cooling the engine and the PCU.

A fourth aspect further has the following features in the second aspect.

The PCU is integrated with the transaxle on an upper surface of the transaxle.

A control unit which is configured to control the HV vehicle and/or the engine is disposed on an upper surface of the PCU.

A fifth aspect further has the following feature in the third aspect.

The PCU is integrated with the transaxle on an upper surface of the transaxle.

A control unit which is configured to control the HV vehicle and/or the engine is disposed on an upper surface of the PCU.

A sixth aspect further has the following feature in the first aspect.

The vehicle component is a control unit for controlling the HV vehicle and/or the engine.

According to the first aspect, the vehicle component is arranged in front of the PCU while the low-voltage battery is arranged in front of the PCU and also on the outer side of the HV vehicle. Therefore, in a head-on collision of the HV vehicle, collision energy is absorbed by the vehicle component. In a collision at diagonally forward of the HV vehicle, the collision energy is absorbed by the low-voltage battery. In addition, according to the first aspect, the stiffness of the vehicle component is lower than that of the PCU. Therefore, even if the vehicle component absorbing the collision energy goes backward, it is possible to reduce a shock to which the PCU is subjected by contacting with the vehicle component. Therefore, it is possible to prevent the PCU from being damaged in the event of the HV vehicle collision.

According to the second, third or sixth aspect, it is possible to prevent the PCU from being damaged in the event of the HV vehicle collision by the air cleaner, the reservoir tank or the control unit. According to the third aspect, it is possible to lessen a distance between the reservoir tank and the PCU. Therefore, it is possible to shorten a hose for cooling which connects the reservoir tank and the PCU and reduce original cost therefor. According to the sixth aspect, it is possible to lessen the distances between the control unit and the PCU. Therefore, it is possible to shorten a wire harness and reduce the original cost therefor.

According to the fourth or fifth aspect, when the air cleaner or the reservoir tank is arranged in front of the PCU, it is possible to shorten the distance between the control unit and the PCU. Therefore, it is possible to shorten a wire harness and reduce the original cost therefor.

DESCRIPTION OF EMBODIMENTS

Figure 1:
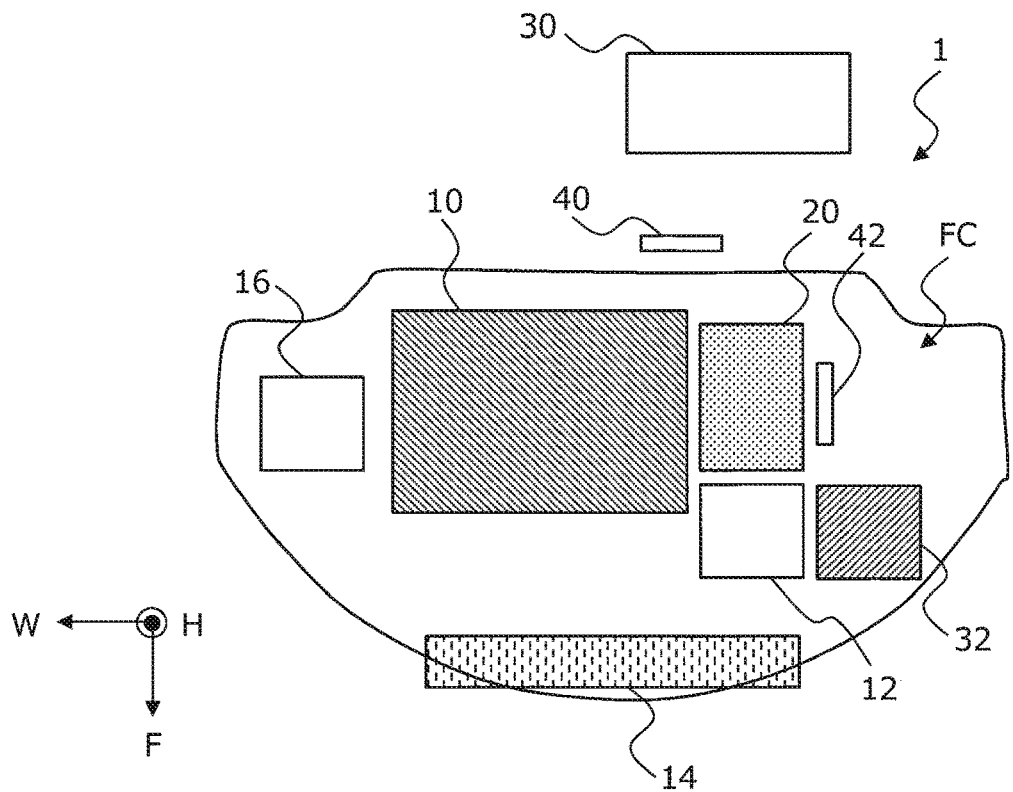
FIG. 1 is a schematic top view of a front compartment to which a layout structure according to a first embodiment of the present disclosure is applied.

Hereinafter, embodiments of the present disclosure will be described with reference to the drawings. It should be noted that same signs are attached to same elements in the respective drawings, and duplicate descriptions are omitted.

1. First Embodiment

First, a layout structure of the first embodiment will be explained with reference to FIG. 1 and FIG. 2. In the drawings, a F-axis of coordinates represents a vehicle's length direction (i.e., a longitudinal direction) of the HV vehicle. A W-axis of the coordinates represents a vehicle's width direction (i.e., horizontal direction). A H-axis of the coordinates represents a vertical direction.

1.1 Configuration of Main Parts of HV Vehicle

FIG. 1 is a schematic top view of a front compartment in a HV vehicle 1 to which the layout structure according to the first embodiment is applied. In FIG. 1, only main parts highly related to the layout structure is depicted. The HV vehicle 1 includes an engine 10, an air cleaner 12, a radiator 14, a reservoir tank 16, a motor unit 20, a high-voltage battery 30, an auxiliary battery 32, a HV-ECU (hybrid Electronic Control Unit) 40, and an EFI-ECU (Electronic Control Unit for engine) 42.

The engine 10 is an internal combustion engine in which thermal energy generated by burning mixed gas is converted into kinetic energy of moving body such as piston, thereby a driving force of the HV vehicle 1 is outputted. The mixed gas is composed of air taken in from the air cleaner 12 and fuels supplied to the engine 10. Examples of fuel of the engine 10 include gasoline, light oil, and hydrogen fuel. An output shaft (not shown) of the engine 10 is connected to a driving force distribution mechanism (not shown) at a vehicle's width direction.

The radiator 14 forms a part of a circulation system of coolant which cools the engine 10 and the PCU. The radiator 14 exchanges heat with the coolant flowing in the circulation system. As temperature of the coolant rises and its volume expands, excess coolant is delivered to the reservoir tank 16. As the temperature of the coolant decreases and its volume shrinks, the coolant is returned from the reservoir tank 16.

The motor unit 20 has an electromechanical integral structure in which the PCU and the transaxle (hereinafter also referred to as a "VA") are directly fastened by screws. FIG. 2 is a schematic view of a left lateral face of the motor unit 20 and its surroundings. As shown in FIG. 2, the motor unit 20 includes a PCU 22 and a T/A 24. The T/A 24 includes two motor/generators for driving 25 and 26, a differential gear 27 and a driving force distribution mechanism. In the following, the motor/generator is also referred to as the "M/G".

An axis 25a of the M/G 25, an axis 26a of the M/G 26 and an axis 27a of the differential gear 27 are arranged so as to be triangular when viewed from the vehicle's width direction. With this arrangement, an upper surface 24a of the T/A 24 is lowered forward. The PCU 22 is fixed an upper surface 24a. A bottom surface 22a of the PCU 22 is inclined by same angle as slope angle of the upper surface 24a. There is no aperture between the bottom surface 22a and the upper surface 24a. Unlike the bottom surface 22a, an upper surface 22b of the PCU 22 is substantially horizontal. A front face 22c of the PCU 22 is substantially perpendicular.

The PCU 22 converts DC power of the high-voltage battery 30 into AC power suitable for driving the M/G 25 and the M/G 26. The driving force distribution mechanism appropriately combines output torque of the engine 10, the M/G 25 and the M/G 26, and outputs the combined torque. The combined torque is transmitted to wheels via the differential gear 27. The driving force distribution mechanism may distribute the output torque of the engine 10 to the M/G 25 and the wheels. In this instance, the HV vehicle 1 generates power at the M/G 25 while traveling by the driving force of the engine 10. The PCU 22 converts the AC power generated by the M/G 25 into the DC power. Regenerative power converted into the DC power is used to charge the high-voltage battery 30.

The auxiliary battery 32 provides power to various auxiliaries. The "auxiliary" is a generic term for a device driven by a low voltage. The "low voltage" means a voltage lower than an output voltage of the high-voltage battery 30. That is, the output voltage of the auxiliary battery 32 is lower than that of the high-voltage battery 30. Examples of the auxiliaries include a control circuit implemented in the PCU 22, the HV-ECU 40, and the EFI-ECU 42, respectively.

The HV-ECU 40 and the EFI-ECU 42 are microcomputers, each of which includes a CPU (Central Processing Unit), a memory, an input/output buffer, and the like (all of which are not shown). The HV-ECU 40 receives a state of the high-voltage battery 30 detected by a power monitoring unit (not shown). The HV-ECU 40 executes control of the M/G 25 and the M/G 26 based on the detected results.

The EFI-ECU 42 receives values such as intake air amount and coolant temperature from various sensors provided in the engine 10, and transmits them to the HV-ECU 40. The EFI-ECU 42 receives from the HV-ECU 40 output command value and target engine speed of the engine 10 based on the detected results.

Here, a housing of the motor unit 20 is made of aluminum die casting, while the air cleaner 12 and reservoir tank 1 are made of resins. Cases of the HV-ECU 40 and EFI-ECU 42 are also made of resins. That is, stiffness of these vehicle component is lower than that of the housing of the motor unit 20.

1.2 Layout Structure

As shown in FIG. 1, the front compartment FC is provided with the engine 10, the air cleaner 12, the radiator 14, the reservoir tank 16, the motor unit 20, the auxiliary battery 32, and the EFI-ECU 42. The high-voltage battery 30 and the HV-ECU 40 are provided on a compartment other than the front compartment FC. The high-voltage battery 30 is provided, for example, on a rear compartment of the HV vehicle 1. The HV-ECU 40 is provided, for example, in a chamber of the HV vehicle 1.

In the front compartment FC, the engine 10, the reservoir tank 16, the motor unit 20 and the EFI-ECU 42 are aligned in the vehicle's width direction. The air cleaner 12 and the auxiliary battery 32 are also aligned in the vehicle's width direction. The air cleaner 12 and the auxiliary battery 32 are located in front of the motor unit 20. More specifically, the air cleaner 12 is located in front of the motor unit 20. The motor unit 20 and the auxiliary battery 32 do not overlap in the vehicle's width direction. The auxiliary battery 32 is located diagonally forward to left of the motor unit 20. That is, the auxiliary battery 32 is located in front of the motor unit 20 and in an outer side of the HV vehicle 1.

Figure 2:
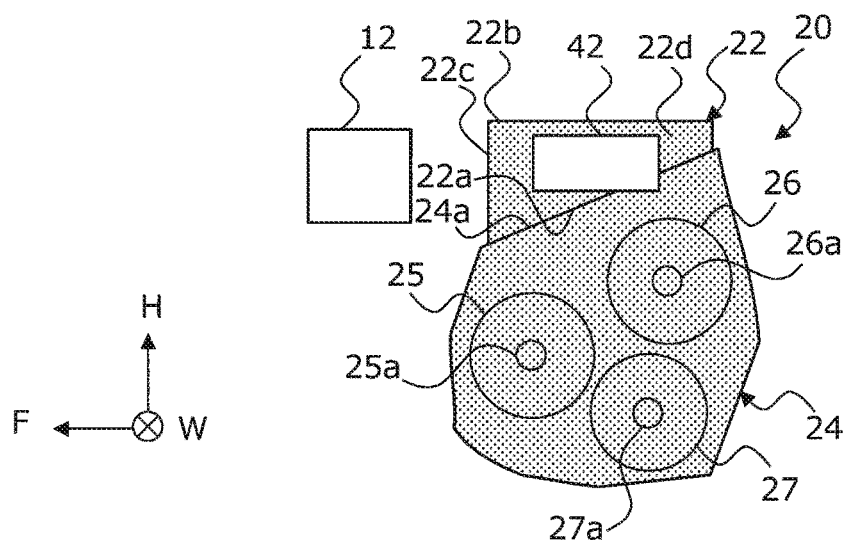
FIG. 2 is a schematic diagram of a left lateral face of a motor unit and its surroundings.

As shown in FIG. 2, the air cleaner 12 is located in front of the front face 22c. That is, the air cleaner 12 is not located in front of the T/G 24 but is located in front of the PCU 22. The EFI-ECU 42 is also located in a leftward direction of the left lateral face 22d of the PCU 22. That is, the EFI-ECU 42 is not located in the leftward direction of the T/G 24 but is located in that of the PCU 22.

1.3 Advantageous Effect

According to the layout structure shown in FIG. 1 and FIG. 2, the air cleaner 12 is arranged in front of the PCU 22. Therefore, in an event of a head-on collision of the HV vehicle 1, the air cleaner 12 is impacted earlier than the PCU 22. Therefore, collision energy is absorbed by the air cleaner 12 thereby the PCU 22 is protected. Also, as described above, the stiffness of the air cleaner 12 is lower than that of the housing. Therefore, even if the collided air cleaner 12 goes backward, it is possible to reduce a shock to which the PCU 22 is subjected by contacting with the air cleaner 12.

According to the layout structure shown in FIG. 1 and FIG. 2, the auxiliary battery 32 is also located in the outer side of the HV vehicle 1 than the motor unit 20. Therefore, even if the collided auxiliary battery 32 goes backward in the event of the head-on collision, it does not interfere with the PCU 22. Further, in a collision at diagonally forward of the HV vehicle 1, the auxiliary battery 32 is impacted earlier than the PCU 22. Therefore, the collision energy is absorbed by the auxiliary battery 32 thereby the PCU 22 is protected.

According to the layout structure shown in FIGS. 1 and 2, further, the EFI-ECU 42 is also arranged in the leftward direction of the PCU 22. As described above, the stiffness of the EFI-ECU 42 is lower than that of the housing. Therefore, in a collision at the left lateral face of the HV vehicle 1, the collision energy is absorbed by the EFI-ECU 42 thereby the PCU 22 is protected.

As described above, according to the layout structure shown in FIG. 1 and FIG. 2, it is possible to prevent the PCU 22 from being damaged when the HV vehicle 1 collides. Therefore, it is possible to ensure security in the PCU 22 as a high voltage component.

2. Second Embodiment

Next, the layout structure relating to a second embodiment of the present disclosure will be described with reference to FIGS. 0.3 and 4. Note that the descriptions overlapping with those in the first embodiment are omitted as appropriate.

2.1 Layout Structure

Figure 3:
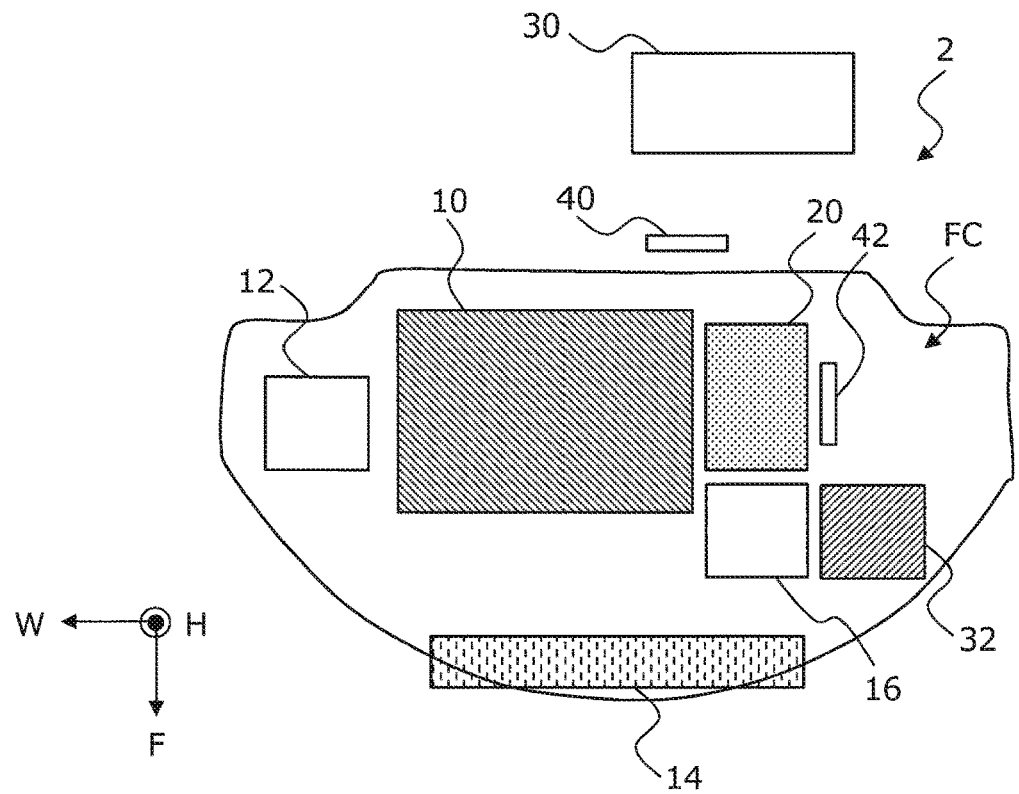
FIG. 3 is a schematic top view of a front compartment to which a layout structure according to a second embodiment of the present disclosure is applied.
Figure 4:
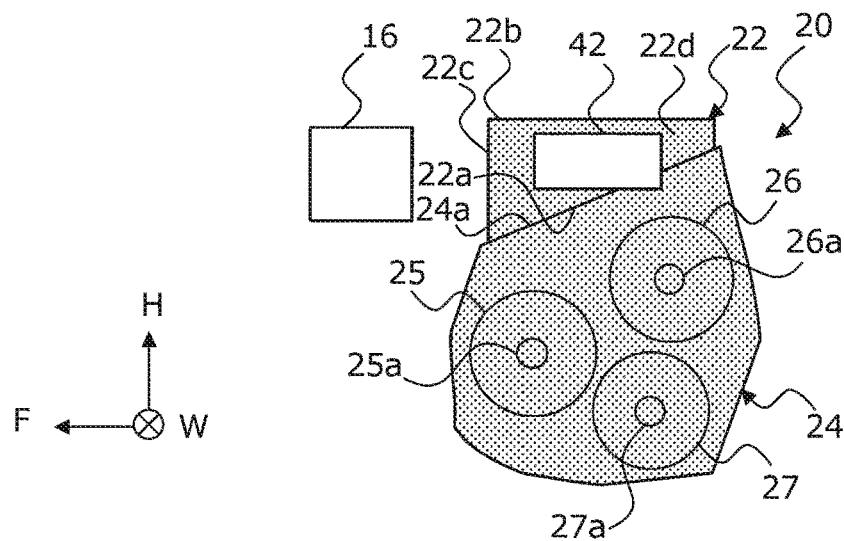
FIG. 4 is a schematic diagram of the left lateral face of the motor unit and its surroundings.

FIG. 3 is a schematic top view of the front compartment in a HV vehicle 2 to which the layout structure according to the second embodiment is applied. FIG. 4 is a schematic view of the left lateral face of the motor unit 20 and its surroundings. The layout structure according to the second embodiment differs from that according to the first embodiment in positions of the air cleaner 12 and the reservoir tank 16.

That is, as shown in FIG. 3, the air cleaner 12 is aligned in vehicle's width direction with the engine 10 and the motor unit 20. The reservoir tank 16 is aligned in the auxiliary battery 32 in the vehicle's width direction. The reservoir tank 16 is also located in front of the motor unit 20. Further, as shown in FIG. 4, the reservoir tank 16 is located in front of the front face 22c. That is, the reservoir tank 16 is not located in front of the T/G 24 but is located in front of the PCU 22.

2.2 Advantageous Effect

According to the layout structure shown in FIG. 3 and FIG. 4, it is possible to obtain advantageous effects equivalent to those obtained by the layout structure according to the first embodiment. That is, in the event of the head-on collision of the HV vehicle 2, the collision energy is absorbed by the reservoir tank 16 thereby the PCU 22 is protected.

In addition, even if the collided reservoir tank 16 goes backward in the event of the head-on collision, it is possible to reduce the shock to which the PCU 22 is subjected by contacting with the reservoir tank 16. Further, in a side collision at the left lateral face, the collision energy is absorbed by the EFI-ECU 42 thereby the PCU 22 is protected.

Further, according to the layout structure shown in FIG. 3 and FIG. 4, it is possible to shorten a distance between the reservoir tank 16 and the PCU 22. Therefore, it is possible to shorten a hose for cooling which connects the reservoir tank 16 with the PCU 22 and reduce original cost for the hose.

3. Third Embodiment

Next, the layout structure according to a third embodiment of the present disclosure will be described with reference to FIG. 5 and FIG. 6. Note that the descriptions overlapping with those in the first embodiment are omitted as appropriate.

3.1 Layout Structure

Figure 5:
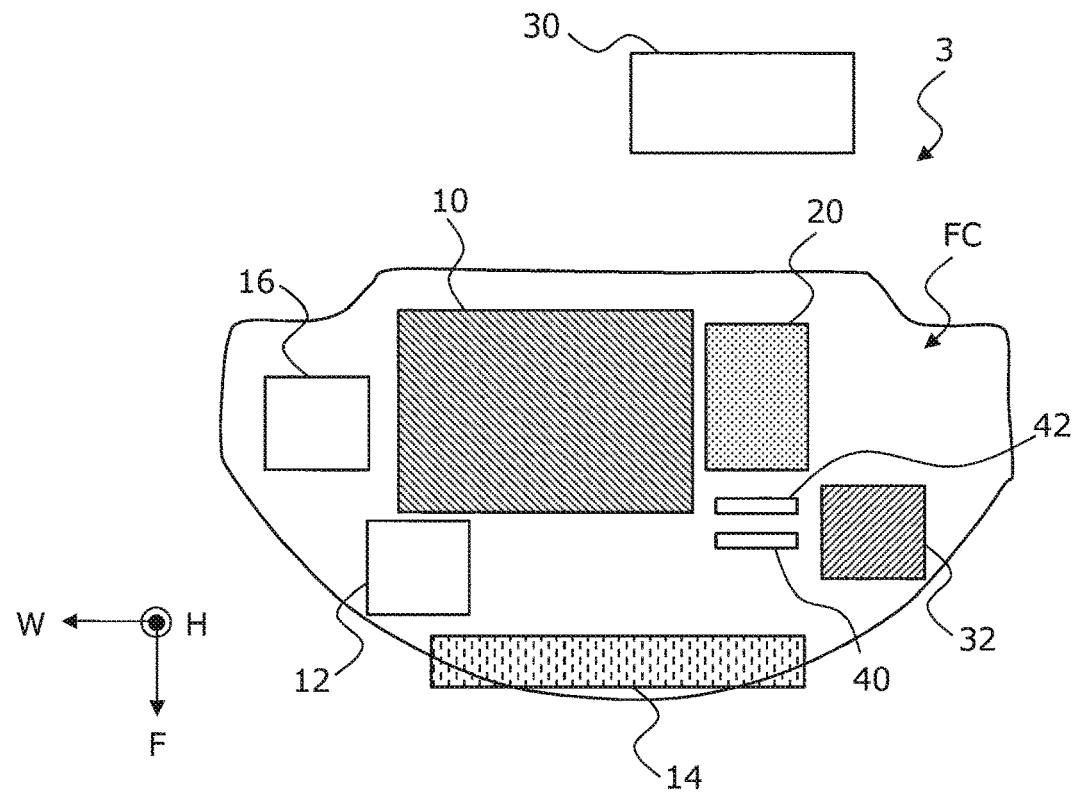
FIG. 5 is a schematic top view of a front compartment to which a layout structure according to a third embodiment of the present disclosure is applied.

FIG. 5 is a schematic top view of the front compartment in a HV vehicle 3 to which the layout structure according to the third embodiment is applied. FIG. 6 is a schematic view of a left lateral face of the motor unit 20 and its surroundings. The layout structure according to the third embodiment differs from that according to the first embodiment in positions of the air cleaner 12, the HV-ECU 40 and the EFI-ECU 42.

That is, as shown in FIG. 5, the air cleaner 12 is positioned diagonally forward to right of the engine 10. Also, the HV-ECU 40 and the EFI-ECU 42 are aligned in the auxiliary battery 32 in the vehicle's width direction. These ECUs are also located in front of the motor unit 20. As shown in FIG. 6, these ECUs are located in front of the front face 22c. That is, these ECUs are not located in front of the T/G 24 but is located in front of the PCU 22.

3.2 Advantageous Effect

Figure 6:
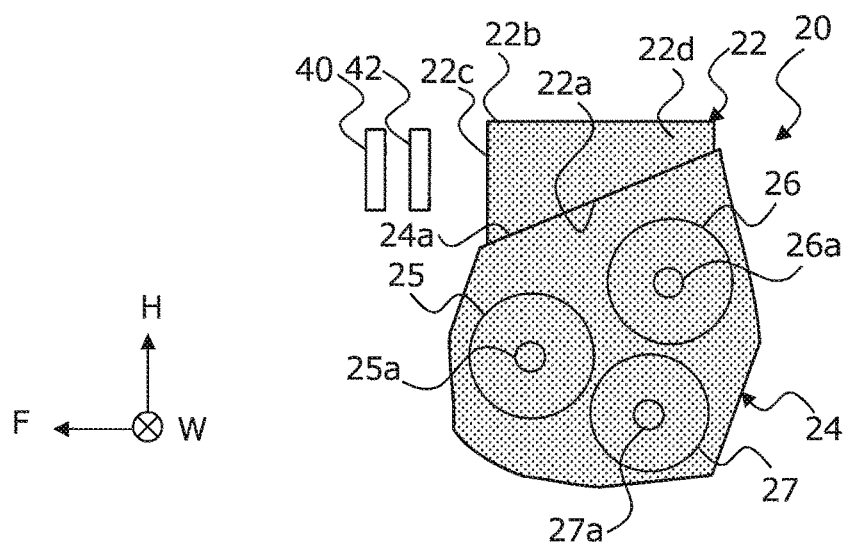
FIG. 6 is a schematic diagram of the left lateral face of the motor unit and its surroundings.

According to the layout structure shown in FIG. 5 and FIG. 6, it is possible to obtain advantageous effects equivalent to those obtained by the layout structure according to the first embodiment. That is, in the event of the head-on collision of the HV vehicle 3, the collision energy is absorbed by the HV-ECU 40 and the EFI-ECU 42 thereby the PCU 22 is protected. In addition, even if the collided HV-ECU 40 and EFI-ECU 42 go backward in the event of the head-on collision, it is possible to reduce the shock to which the PCU 22 is subjected by contacting with these ECUs.

Further, according to the layout structure shown in FIGS. 5 and 6, it is possible to shorten the distances between the EFI-ECU 42 and the engine 10. In addition, since the HV-ECU 40 is provided in the front compartment FC, it is possible to shorten the distance between the two ECUs and the distance between the HV-ECU 40 and the PCU 22.

Therefore, it is possible to shorten the wire harness and reduce the original cost for the wire harness.

4. Fourth Embodiment

Next, the layout structure according to a fourth embodiment of the present disclosure will be described with reference to FIG. 7 and FIG. 8. Note that the descriptions overlapping with those in the first embodiment are omitted as appropriate.

4.1 Layout Structure

Figure 7:
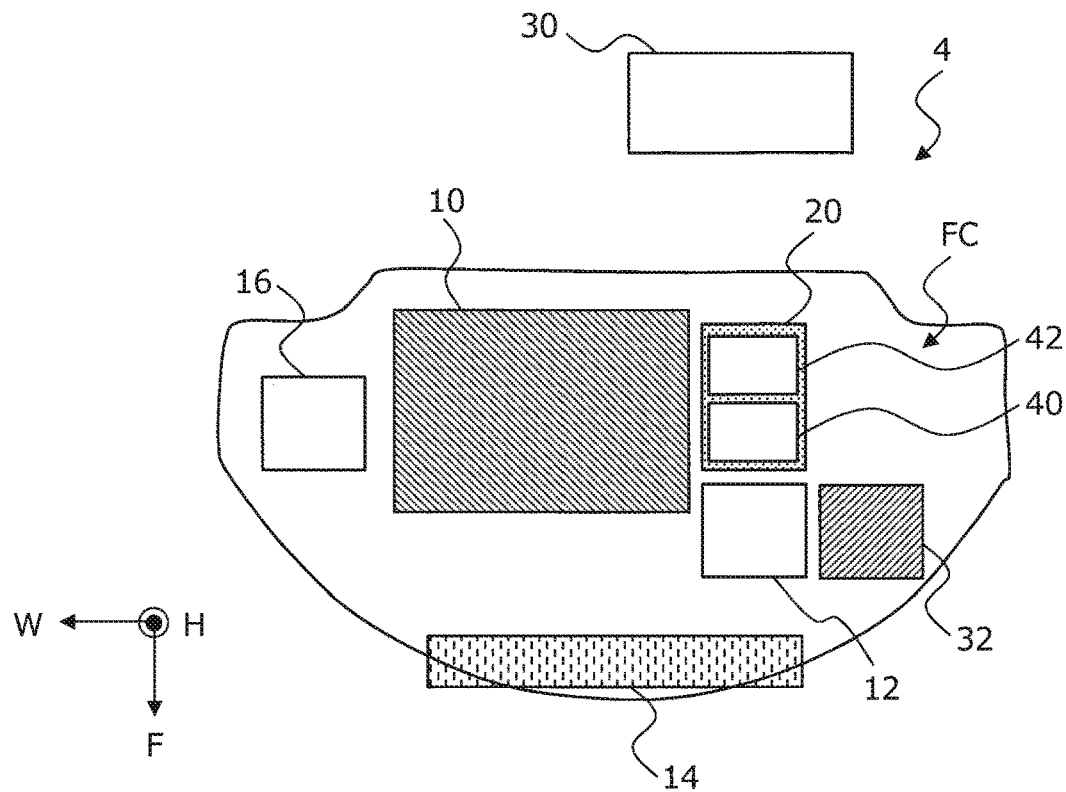
FIG. 7 is a schematic top view of a front compartment to which a layout structure according to a fourth embodiment of the present disclosure is applied.

FIG. 7 is a schematic top view of the front compartment in a HV vehicle 4 to which the layout structure according to the fourth embodiment is applied. FIG. 8 is a schematic view of the left lateral face of the motor unit 20 and its surroundings. The layout structure according to the fourth embodiment differs from that according to the first embodiment in positions of the HV-ECU 40 and the EFI-ECU 42.

That is, as shown in FIG. 7, the HV-ECU 40 and the EFI-ECU 42 are provided above the motor unit 20. As shown in FIG. 8, these ECUs are aligned above the upper surface 22b. Such an arrangement is realized by a reduction in the vertical length due to the structure of the motor unit 20 (i.e., the electromechanical integral structure).

4.2 Advantageous Effect

Figure 8:
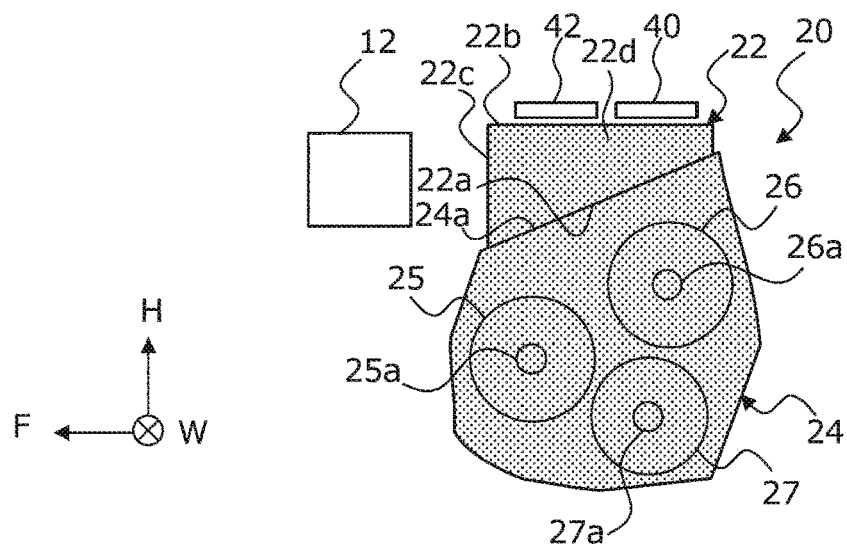
FIG. 8 is a schematic diagram of the left lateral face of the motor unit and its surroundings.

According to the layout structure shown in FIG. 7 and FIG. 8, in addition to the advantageous effects by the layout structure according to the first embodiment, the following effects are obtained. That is, according to the layout structure shown in FIG. 7 and FIG. 8, it is possible to shorten the distance between the EFI-ECU 42 and the engine 10. In addition, since the HV-ECU 40 is provided in the front compartment FC, it is possible to shorten the distance between the HV-ECU 40 and the EFI-ECU 42 and the distance between the HV-ECU 40 and the PCU 22. Therefore, it is possible to shorten the wire harness and reduce the original cost for the wire harness.

5. Other Embodiments

In the layout structures according to the first to fourth embodiments, the motor unit 20 having the electromechanical integral structure is assumed. However, in the layout structures according to the first to third embodiments, the PCU 22 and the VA 24 may be connected via a bracket.

Further, in the third embodiment, the HV-ECU 40 and the EFI-ECU 42 are disposed in front of the PCU 22. However, only the HV-ECU 40 may be disposed in front of the PCU 22 while the EFI-ECU 42 may be disposed in the leftward direction of the left lateral face 22d. Only the EFI-ECU 42 may be disposed in front of the PCU 22 while the HV-ECU 40 may be disposed in the leftward direction of the left lateral face 22d. When the HV-ECU 40 or the EFI-ECU 42 is disposed in the leftward direction of the left lateral face 22d, a protective effect of the PCU 22 in the side collision at left lateral face is expected.

6. Correspondence Between Embodiments and Aspects

In the embodiments described above, any one of the air cleaner 12, the reservoir tank 16, the HV-ECU 40, and the EFI-ECU 42 corresponds to the "vehicle component" of the first aspect. The auxiliary battery 32 corresponds to the "low-voltage battery" of the first aspect. The HV-ECU 40 and the EFI-ECU 42 correspond to the "control unit" of the fourth to sixth aspect.

What is claimed is:

1. A layout structure for a front compartment of a hybrid vehicle, the front compartment is provided with:
   an engine;
   a transaxle which is configured to house a motor for traveling;
   a power control unit which is provided on an upper surface of the transaxle, the power control unit is configured to control transmission of power between the motor for traveling and a high-voltage battery;
   a low-voltage battery; and
   a vehicle component of which stiffness is lower than that of the power control unit, wherein:
   the engine and the transaxle are aligned in a vehicle's width direction;
   the vehicle component and the low-voltage battery are aligned in a vehicle's width direction in front of the power control unit;
   the vehicle component is located in front of the power control unit; and
   the low-voltage battery is located in an outer side of the hybrid vehicle than the vehicle component.

2. The layout structure according to claim 1, wherein the vehicle component is an air cleaner of the engine.

3. The layout structure according to claim 1, wherein the vehicle component is a reservoir tank of coolant for cooling the engine and the power control unit.

4. The layout structure according to claim 2, wherein the power control unit is integrated with the transaxle on an upper surface of the transaxle, wherein a control unit which is configured to control the hybrid vehicle and/or the engine is disposed on an upper surface of the power control unit.

5. The layout structure according to claim 3, wherein the power control unit is integrated with the transaxle on an upper surface of the transaxle, wherein a control unit which is configured to control the hybrid vehicle and/or the engine is disposed on an upper surface of the power control unit.

6. The layout structure according to claim 1, wherein the vehicle component is a control unit for controlling the hybrid vehicle and/or the engine.

\* \* \* \* \*